Jan. 26, 1960   R. W. JENSEN   2,922,431
FLUID FLOW CONTROL SYSTEM
Filed April 28, 1954   3 Sheets-Sheet 1

RAYMOND W. JENSEN,
INVENTOR.

BY John H. J. Wallace

Jan. 26, 1960   R. W. JENSEN   2,922,431
FLUID FLOW CONTROL SYSTEM
Filed April 28, 1954   3 Sheets-Sheet 3

RAYMOND W. JENSEN,
INVENTOR.

BY

United States Patent Office

2,922,431
Patented Jan. 26, 1960

2,922,431

FLUID FLOW CONTROL SYSTEM

Raymond W. Jensen, Encino, Calif., assignor to The Garrett Corporation, Los Angeles, Calif., a corporation of California Application April 28, 1954, Serial No. 426,156

15 Claims. (Cl. 137—117)

The present invention relates generally to fluid flow control systems and is more particularly concerned with a fluid flow control system incorporating a flow limiting valve arrangement for controlling flow of fluid under pressure from a source to a point of use.

In many systems, where fluid flow is utilized, for example, for driving a turbine and where varying loads are imposed on such turbine, frequent pressure surges have been commonly encountered. When air delivered from such a system is utilized for air conditioning or pressurization of an inhabited enclosure, it is desirable to maintain the rate of flow of the air at a relatively constant level and to prevent rapid changes in air pressure or flow rate to such enclosure.

It is accordingly one object of the present invention to provide a fluid flow limiting valve for use in a fluid control system.

It is another object of the present invention to provide a fluid flow control system including a novel flow limiting valve arrangement, and associated control means for the valve and the system.

It is a further object of the present invention to provide a fluid flow control system for use in controlling the flow of fluid to one or more points of use.

It is a still further object of the present invention to provide a fluid flow control system and associated fluid flow limiting valve arrangement for use in pneumatic systems wherein frequent changes in fluid flow rates are encountered and wherein a specific quantity of fluid is required for delivery to one or more points of use.

It is another important object of the present invention to provide a novel flow limiting valve and a novel valve member therefor, in addition to control means for effective operation of the valve member.

It is still another object of the present invention to provide a fluid flow limiting valve for use in a fluid flow control system to control the flow of air or other fluid in such a manner as to eliminate surge and to provide constant volume flow to such enclosures.

Other and further important objects of the present invention will become apparent from the disclosures in the following detailed specification, appended claims and accompanying drawings, wherein:

Fig. 5 is a partially schematic sectional view showing another form of the present invention.

Figure 1:
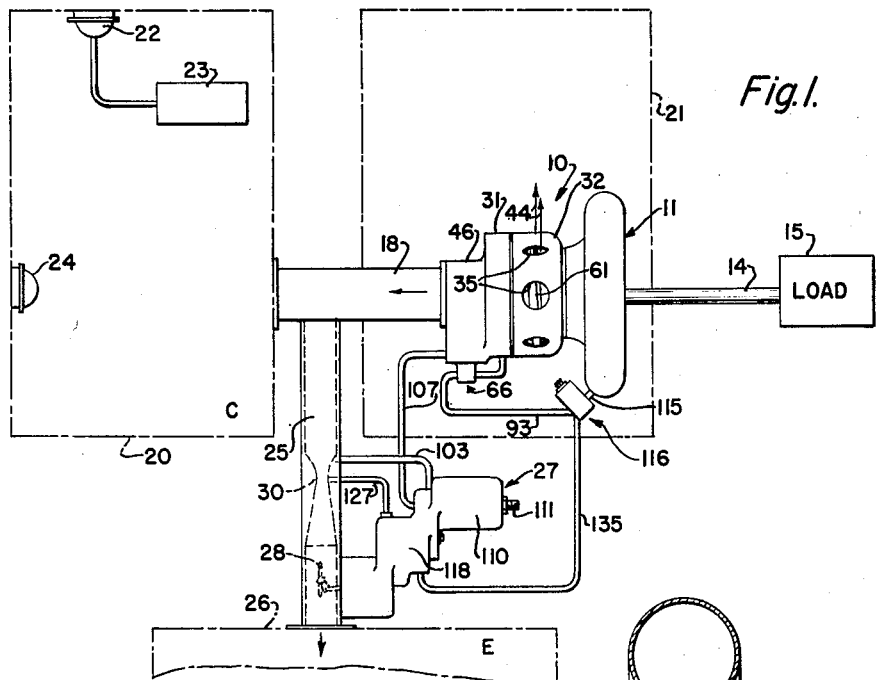
Fig. 1 is a schematic view of a fluid flow control system in accordance with the present invention.
Figure 2:
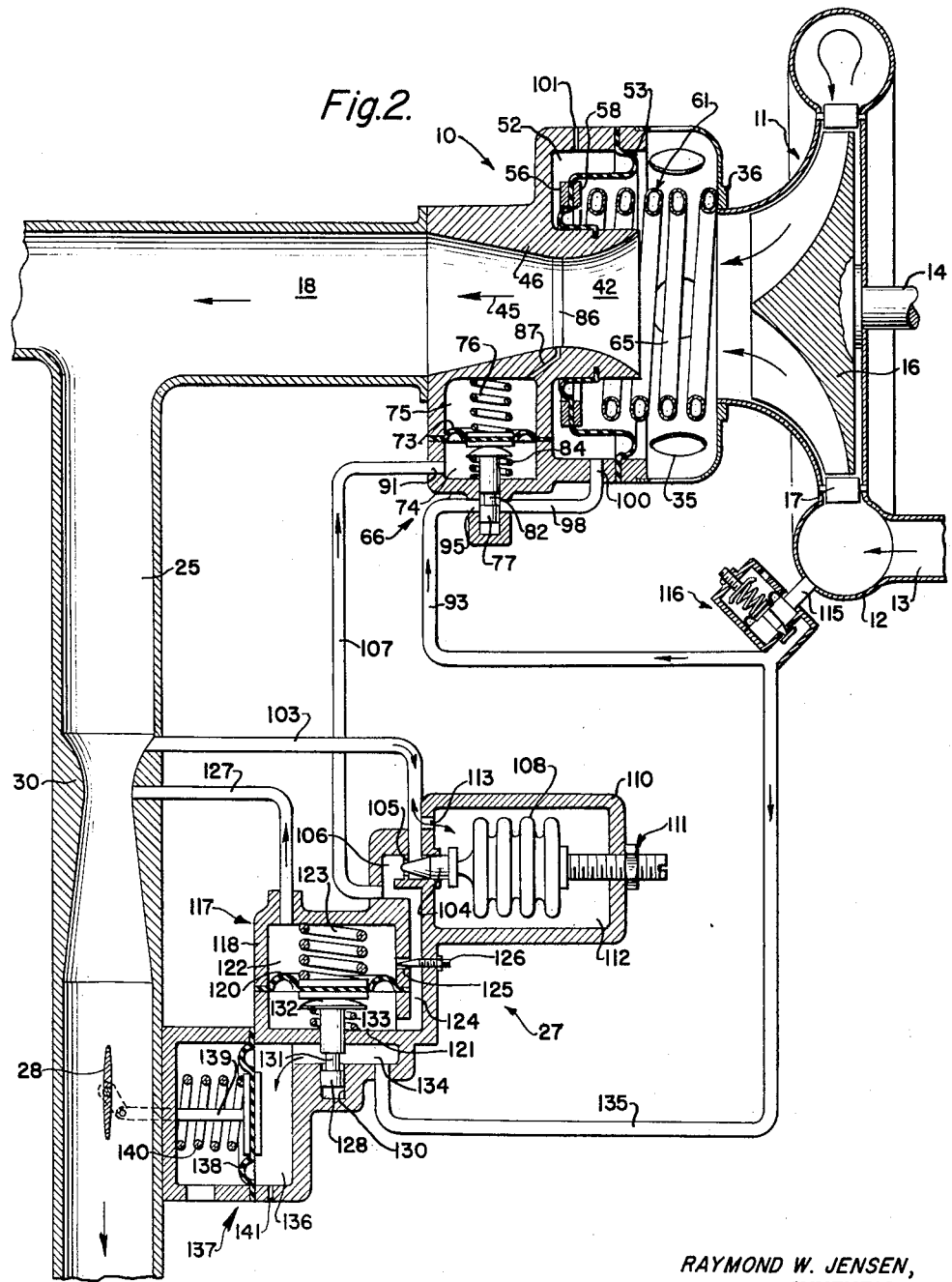
Fig. 2 is a partially schematic sectional view, on an enlarged scale, showing details of one form of the fluid flow control system of the present invention.
Figure 3:
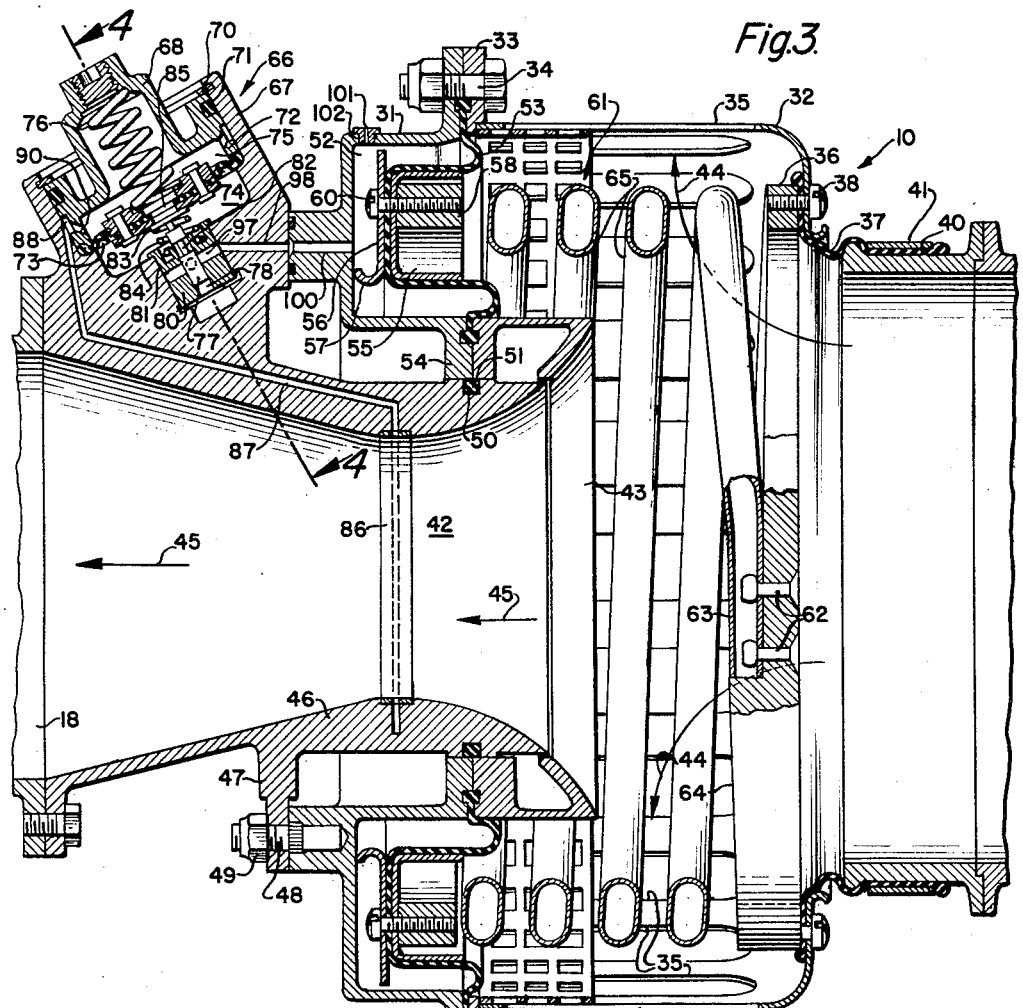
Fig. 3 is an enlarged axial sectional view of a modified flow limiting valve arrangement utilized in the flow control system of the present invention.

Referring primarily to Figs. 1, 2 and 3 of the drawings, wherein one system incorporating the present invention is shown, the flow limiting valve for use in the fluid flow control system is indicated generally at 10. As shown, the valve 10 is disposed immediately downstream from an expansion turbine 11 having an inlet scroll 12 to which a source of fluid under pressure may be connected by a conduit 13. A power take-off shaft 14 is adapted for connection to a suitable load, indicated schematically at 15, this shaft being connected to a turbine wheel 16. A variable area nozzle 17 is disposed between the inlet scroll 12 and the entrance to the turbine wheel 16.

For a complete understanding of the present invention and the scope thereof, it is to be noted that the expansion turbine 11 is shown by way of example only, as one means by which a fluid flow may be utilized to accomplish work. In turbines of this type, surge conditions may be encountered, due partially to the operation of the variable area nozzle 17 which controls the output speed of the shaft 14 to maintain a relatively constant value. Such constant shaft speed is often desirable when the load is, for example, an alternator. It is to be understood that the present invention may be utilized with various driving and loading devices without departing from the spirit and scope of the claims herein. For example, fluid flow may be bled off on a point in the system substantially upstream of the flow limiting valve 10, this bleed fluid being used in any of a variety of applications, such diversion of fluid flow naturally causes a drop in the pressure of the fluid entering the flow limiting valve. Without such a flow limiting valve, surge conditions would inherently exist downstream from the position occupied by the flow limiting valve in the present invention.

With reference again primarily to Figs. 1 and 2, the downstream end of the flow limiting valve 10 is connected to a conduit 18 which extends to a compartment, such as, for example, a closed chamber or aircraft cabin 20. For a purpose to be hereinafter described the flow limiting valve 10 together with portions of the conduit 18 may be disposed in a second compartment 21. The compartment 20 may be provided with an outflow valve 22 operatively connected to a pressure regulator 23. Additionally, the compartment 20 may be provided with a safety valve 24, the valves 22 and 24 together with the regulator 23 being customary equipment of pressurized aircraft cabins or the like, and being shown by way of example only and forming no part of the present invention.

The conduit 18 is provided with a branch conduit 25 leading therefrom, this conduit 25 extending to a third compartment 26. A fluid flow controller, indicated generally at 27, is disposed in operative relationship to the conduit 25 and adapted for operation of a butterfly valve 28 disposed in the conduit 25. A venturi tube 30 is also disposed in the conduit 25, upstream from the butterfly valve 28, and the purpose and use of the venturi 30 will be hereinafter more fully described.

With reference now primarily to Fig. 3, the flow limiting valve 10 includes a substantially annular housing 31 secured to a web section 32 by a flange 33 and bolts 34. The web section 32 is provided with relatively large circular openings 35 about the periphery thereof, the end opposite the flange 33 being secured to a retainer ring 36 and to a flexible connecting member 37 by screws 38. The flexible member 37 is operatively connected to an inlet annulus 40 by a clamp ring 41. The annulus 40 may be connected, in any suitable manner, to a source of fluid under pressure, or directly to the discharge end of the expansion turbine 11, as shown in Figs. 1, 2 and 5.

A venturi tube 42 is disposed axially within the flow limiting valve 10 and has its inlet portion 43 disposed in spaced relationship to the inlet annulus 40, thus to define a flow path outwardly from the limiting valve, as indicated by the arrows 44, while other portions of the fluid flow through the valve are conducted through the venturi 42 as indicated by the arrows 45.

The portion of the valve 10 which serves to house and form the venturi tube 42 is indicated at 46 and is secured to the valve housing 31 by a flange 47 and studs 48 with attached nuts 49. The valve portion 46 is adapted to mate with the housing portion 31 and an O ring 50, positioned in an annular groove 51, provides a sealing means therebetween.

An annular chamber 52 is spaced about and disposed radially outwardly from the venturi 42 and defined by portions of the housing 31. A diaphragm 53 has its outer edge positioned intermediate the housing 31 and the flange 33 while its inner edge is connected to a housing portion 54 to provide an annular movable wall for one side of the chamber 52. The central area of the diaphragm 53 is provided with an annular, substantially U-shaped backup member 55 positioned on the side of the diaphragm remote from the chamber 52. On the chamber side, the diaphragm is further provided with a second annular stiffening member 56 which has a curved inner periphery 57 that is adapted to contact one wall of the chamber 52 and limit movement of the diaphragm toward the chamber. A retainer 58 is also positioned within the U-shaped backup member 55, the member 55, stiffening member 56 and retainer 58 being secured together with the diaphragm 53 by screws 60.

As shown primarily in Fig. 3, a generally helically shaped, resilient valve member 61 is disposed in the fluid path indicated by the arrows 44. One end of the spring-like valve member 61 is secured to the retainer 36 by rivets 62, with the associated end of the valve member being tapered as shown at 63 in order to conform to a radially tapered face 64 of the retainer 36, thereby to provide a smooth curve continuing from the end 63 of the valve member 61 for the fluid flow. The other end of the valve member 61 is connected, in a like manner, to the retainer 58, which is in turn secured to the flexible diaphragm 53. The valve member 61 has a plurality of convolutions and is made from relatively thin walled, hollow tubing having a generally oval configuration in cross section. Adjacent edges or sides 65 of the convolutions of the valve member 61 are adapted, upon movement of the diaphragm 43, to contact each other, thus closing the flow path defined by the arrows 44. The spaces between the convolutions of the valve member 61 provide a means permitting fluid to flow along the path shown by the arrows 44 and outwardly through the openings 35 in the web structure 32. It may be seen that the resiliency of the valve member 61 tends to urge the diaphragm 53 in a direction toward the chamber 52. The oval cross section of the convolutions of the valve member 61 permits a low spring rate.

The flow limiting valve 10 is provided with an integral pilot valve arrangement, indicated generally at 66. The pilot valve 66 comprises a cup-shaped housing 67 which is formed from the venturi housing structure 46, there being a cap portion 68 disposed in the housing 66 and retained therein by a snap ring 70. An annular seal 71, disposed about the cap portion 68, seals the cap portion with respect to the housing 67. The cap portion 68 has an axially extending annular flange 72 which cooperates with a portion of the housing 67 to support the periphery of a diaphragm 73, this diaphragm forming a movable wall and dividing the pilot valve into two chambers 74 and 75. A compression spring 76 is disposed between the cap 68 and the diaphragm 73 and normally biases the diaphragm in a direction toward the chamber 74.

A primary pilot valve member 77 is disposed for sliding movement in a bore 78 which is in turn formed in an insert 80. The insert 80 is disposed within a recess 81, formed in the base of the chamber 74. The pilot valve member 77 has an annular, reduced diameter portion 82 and a head portion 83 which is adapted to contact the diaphragm 73. A compression spring 84, disposed between the insert 80 and the head 83 of the pilot valve member 77, normally biases the pilot valve member into engagement with the diaphragm 73. The head portion 83 of the pilot valve member 77 has a headed projection 85 extending through the central area of the diaphragm 73 to secure the valve member 77 and to cause it to move with the diaphragm 73.

Figure 4:
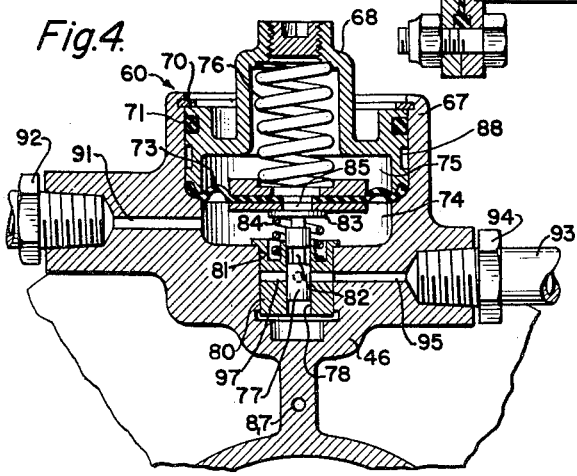
Fig. 4 is an enlarged sectional view through the pilot valve arrangement, taken substantially as indicated by line 4—4, Fig. 3.

In the pilot valve 66, the chamber 75 is vented to a low pressure area, provided by the throat 86 of the venturi 42, by a passageway 87 in the venturi wall structure 46, an annular passage 88 between the cap 68 and the housing 67 and lateral passages 90 through the wall of the flange portion 72 of the cap 68. The chamber 74 is connected for communication with a source of reference pressure, in a manner to be hereinafter more fully described, by means of a passageway 91 (Fig. 4) which extends to an external fitting 92.

A source of control or motive fluid under pressure is connected to the pilot valve 66 through a conduit 93 which is connected to a fitting 94 and communicates with a passageway 95. The passageway 95 further communicates with one end of one of a pair of angularly related bores 97 extending through the insert 80 and communicating with the bore 78 in which the pilot valve member is slidably positioned. A bore or passageway 98 through the pilot valve housing 67 communicates with the other bore 97 and a bore 100, formed in the housing 31, and extending to the chamber 52. It may thus be seen that, upon movement of the pilot valve member 77 to a position whereby its reduced diameter portion 82 is aligned with the radial bores 97 through the insert 80, communication is established between the source of control fluid under pressure, from the passage 95 through the passages 98 and 100, to the chamber 52. An orifice 101 formed in a fitting 102 in the housing 31 permits controlled fluid flow outwardly from the chamber 52.

With reference now primarily to Fig. 2, the reference pressure, utilized for control purposes in chamber 74, is transmitted thereto from the venturi 30, in the branch conduit 25, by way of a conduit 103 which conducts fluid under pressure, as sensed at the entrance of the venturi 30, past a contoured metering valve 104, operating in conjunction with an orifice 105, through a passage 106, formed in the body of the flow controller 27, and through a conduit 107 to the passage 91 and into the chamber 74. The predetermined contour of the valve 104 determines the amount of compensation in the system for changes in the density of the fluid. The metering valve 104 is operably connected to an absolute pressure responsive, evacuated bellows 108 which is positioned within a housing 110 of the flow controller. Adjustment means 111 is provided for positioning of the bellows 108 and of the metering valve 104. A chamber 112, surrounding the bellows 108, is adapted for reception of high pressure fluid from the conduit 103 through a port 113, thereby to position the metering valve 104 in accordance with the density of the fluid flowing through the conduit 25 at a given temperature.

The position of the pilot valve 77 thereby is controlled in accordance with the differential in pressure between the throat of the venturi 42 and the reference pressure sensed upstream of the venturi 30. With reference to Fig. 5, it is to be noted that another reference pressure source may be utilized connected through a conduit 107a, and a passage 114 which extends to a point upstream from the throat of the venturi 42a to sense the pressure at the inlet thereof. Accordingly, as the pressure of the fluid in the conduits 18 and 25 tends to increase, or as the flow through the venturi 42 tends to increase due to upstream surges above the flow limiting valve 10, a lower pressure will be sensed in the chamber 75 of the pilot valve 66 and a higher pressure will be sensed in the chamber 74, thereby to move the pilot valve 77 in a direction to close communication between the passages 95, 98 and 100 and reduce the flow of control fluid under pressure to the chamber 52. This action will permit the diaphragm 53 to be moved inwardly toward the chamber 52, by the resilient action of the valve member 61, thereby permitting the spaces between the convolutions of the valve member 61 to increase and causing an increased fluid flow between these convolutions along the flow paths 44. The additional flow of fluid along the paths 44 will decrease the fluid flow in the conduits 18 and 25, or in the conduit 18 should the system be utilized with a single conduit. This will permit the pilot valve 77 to assume a metering position to allow a metered flow of control fluid, under pressure, through the conduits 95, 98 and 100. As fluid flow to the valve 10 decreases, the opposite action will take place.

As shown primarily in Figs. 1, 2 and 5, the control fluid under pressure and metered by the pilot valve 77, is obtained from any convenient point through the conduit 93 which, for purposes of illustration only, is shown as being connected to the turbine scroll 12 by way of a conduit 115 and a suitable pressure regulator 116. In this connection, it is to be understood that any other suitable source of control pressure may be utilized, provided this pressure is at a level sufficient to permit complete closure of the spaces intermediate the convolutions of the valve member 61.

The butterfly valve member 28, positioned in the conduit 25 downstream from the venturi 30, serves, in conjunction with the flow controller 27, to control the fluid flow in the conduit 25 for delivery thereof to the compartment 26. For this purpose, a secondary pilot valve arrangement 117 is provided with a housing 118 in which a diaphragm 120 is positioned. The diaphragm 120 divides the housing 118 into chambers 121 and 122 and forms a movable wall therebetween. A compression spring 123, positioned in the chamber 122, normally urges the diaphragm 120 toward the chamber 121. Relatively high reference pressure obtained upstream of venturi 30 is conducted by way of the conduit 103 past the metering valve 104 through the passage 106 and a further passage 124 to the chamber 121. This fluid under pressure also is transmitted to the chamber 122 past an adjustable orifice 125 having a needle valve 126 positioned therein. The chamber 122 is also connected to the throat of the venturi 30 by a conduit 127.

A secondary pilot valve member 128 is reciprocally positioned in a bore 130 and has a reduced diameter portion 131. A head portion 132 of the pilot valve member 128 is adapted for operative engagement with the diaphragm 120, there being a compression spring 133, positioned between the head 132 of the pilot valve member 128 and a fixed wall of the chamber 121, normally to urge the head of the pilot valve member into engagement with the diaphragm 120. The pilot valve member 128 is adapted to control the flow of control fluid under pressure through a passage 134, this control fluid being delivered to the passage 134 by a conduit 135 that is connected to the control pressure conduit 93 downstream from the pressure regulator 116. The flow of control fluid through the passage 134 is conducted to a chamber 136 of a pneumatic actuator 137 having a diaphragm 138 which is operatively connected to a shaft 139, which is in turn connected for operating the butterfly valve member 28. A compression spring 140 normally urges the butterfly valve member 28 toward an open position, as shown in Fig. 2, with the diaphragm 138 being exposed on one side to the pressure within the chamber 136 and on the other side to atmospheric pressure. The chamber 136 is exhausted by an orifice 141.

It may thus be seen that the passage 124, leading to the chamber 121 and the orifice 125 extending to the chamber 122, both of these points being exposed to high pressure fluid from the conduit 103 obtained upstream from the venturi 30 serve as a pressure divider. Fluid in the chamber 122 is also permitted to flow outwardly to a region of low pressure by way of the conduit 127 extending to the throat of the venturi 30. The needle valve 126 serves as an adjustment means in order to compensate for any normal pressure drop in the conduits 18 and 25 and to match operational characteristics of the pilot valves 77 and 128.

Any tendency for the flow within the conduit 25 to increase will cause an increased pressure in the chamber 121 and a decreased pressure in the chamber 122 thereby permitting the pilot valve to move toward an open position and causing an increased flow of control fluid under pressure to the chamber 136 thereby moving the diaphragm 138 in a direction to close the butterfly valve member 28 and limit flow through the conduit 25 to the chamber 26. Should the flow within the conduit 25 decrease the converse will be true, to cause movement of the butterfly valve member 28 towards an open position, thereby increasing fluid flow to the compartment 26. For most conditions of operation, the butterfly valve member 28 will be positioned between a fully open and a fully closed position and will serve to meter the flow of fluid under pressure of the chamber 26.

With reference primarily to the form of the invention shown in Fig. 2, it is to be noted that the reference pressure established through the conduit 103 and obtained from a point upstream from the throat of the venturi 30 is utilized to effect comparison between the operation of the primary pilot valve 77 and secondary pilot valve 128 so that fluid flow control at three different points, i.e., upstream from the venturi 42, in a branch conduit 25 and in the conduit 18 downstream from its point of connection with the branch conduit 25, may be maintained by controlling only two of these points. Additionally, it is to be noted that the absolute pressure sensing bellows 108 affects the reference pressure, utilized in connection with both of the pilot valves 77 and 128, thereby controlling fluid flow in the conduits 18 and 25 in accordance with the density of the fluid flowing therein. Accordingly, when the present device is utilized under conditions where the barometric pressure may change, such as for example in aircraft flying at various altitudes, the present device acts as a control system that has a control function based upon the density of the fluid flowing therethrough.

With reference specifically to the form of the invention shown in Fig. 5, it is to be noted that this form of the invention is substantially the same as that shown in Fig. 2 with the exception that the conduit 18a is the sole means for conducting a flow of fluid from the flow limiting valve 10, the balance of the mechanism being substantially the same as that shown in a portion of Fig. 2, with like parts being indicated by like reference numerals followed by the letter a.

With reference again to Fig. 1, it is to be noted that the flow limiting valve 10 is physically positioned within the chamber 21 in order that the discharge from the openings 35, along the path indicated by the arrows 44, may be utilized in the compartment 21, for example, for cooling electronic equipment or the like. Full use may thereby be made of the total fluid discharge from the expansion turbine 11. In some instances, however, it may be desirable to dump the excess flow from the flow limiting valve 10 to atmosphere or to other regions of lower pressure.

Having thus described the invention and the present embodiments thereof, it is desired to emphasize the fact that many modifications may be resorted to in a manner limited only by a just interpretation of the following claims.

I claim:

1. A fluid flow control system for governing the flow of fluid under pressure from a source to a point of use comprising: a flow limiting valve operative to by-pass a portion of said fluid; venturi means operatively associated with said valve; movable wall means for actuating said flow limiting valve; a chamber, said movable wall means forming one side of said chamber; means for delivering fluid under pressure to said chamber; control means for regulating the flow of fluid under pressure to said chamber; passage means for applying the pressure differential across said venturi means to said control means to effect operation thereof; valve means in a part of said passage means to vary the pressure differential applied to said control means; and actuating means exposed to the fluid in the system and responsive to changes in density thereof to adjust said valve means.

2. A fluid flow control system adapted for controlling the flow of fluid under pressure from a source to a point of use comprising: a housing forming a flow passage and an annular port opening to the ambient atmosphere; venturi means operatively associated with said system to receive fluid flowing through said flow passage; a helically shaped resilient valve member extending axially of said housing across said port to control flow therethrough; movable annular wall means for actuating said valve member; an annular chamber, said movable wall means forming one side of said chamber; means for delivering control fluid under pressure to said chamber; and control means responsive to a differential in pressure across said venturi means for regulating the flow of said control fluid to said chamber.

3. A fluid flow control system adapted for controlling the flow of fluid under pressure from a source to a point of use comprising: a housing forming a flow passage and an annular port opening to the ambient atmosphere; venturi means operatively associated with said system to receive fluid flowing through said flow passage; a helically shaped resilient valve member extending axially of said housing across said port to control flow therethrough; movable wall means for actuating said valve member; a chamber, said movable wall means forming one side of said chamber; means for delivering control fluid under pressure to said chamber for movement of said movable wall in one direction, said valve member being adapted to cause movement of said movable wall in another direction; and control means for regulating the flow of said control fluid to said chamber, said control means having a valve element and a movable actuating wall operatively disposed relative to said valve element, said actuating wall being exposed and responsive to pressure differentials across said venturi means.

4. A fluid flow control system adapted for controlling flow of fluid under pressure from a source and delivery toward a point of use comprising: a flow limiting valve; a first venturi forming a portion of said valve; a helically shaped resilient valve member; a diaphragm operatively positioned for actuation of said valve member; a chamber, said diaphragm forming one side of said chamber; a pilot valve for controlling the flow of control fluid under pressure to said chamber for effecting movement of said diaphragm in one direction toward a closed position of said valve member, said resilient valve member being operative to urge said diaphragm in another direction toward an open position of said valve member; a pressure sensitive actuating member for controlling movement of said pilot valve; and a second venturi arranged in series with said first venturi, said actuating member being exposed to the difference of fluid pressure at the throat of said first venturi and fluid pressure upstream from said second venturi, whereby said pilot valve is moved to control fluid flow to said chamber in response to pressure changes of fluid flow from said source.

5. A fluid flow control system adapted for controlling flow of fluid under pressure from a source and delivery toward a point of use comprising: a flow limiting valve; a first venturi forming a portion of said valve; a helically shaped resilient valve member; a diaphragm operatively positioned for actuation of said valve member; a chamber, said diaphragm forming one side of said chamber; a pilot valve for controlling the flow of control fluid under pressure to said chamber for effecting movement of said diaphragm in one direction toward a closed position of said valve member, said resilient valve member being operative to urge said diaphragm in another direction toward an open position of said valve member; a pressure sensitive actuating member for controlling movement of said pilot valve; a fluid flow regulator; and a second venturi forming a portion of said fluid flow regulator and arranged in series with said first venturi, said actuating member being exposed on one side to throat fluid pressure of said first venturi and on the other side to fluid pressure upstream from said second venturi, whereby said pilot valve is moved to control fluid flow to said chamber in response to pressure changes in fluid flow from said source.

6. A fluid flow control system adapted for controlling flow of fluid under pressure from a source and delivery toward a point of use comprising: a flow limiting valve; a first venturi forming a portion of said valve; a helically shaped resilient valve member; a diaphragm operatively positioned for actuation of said valve member; a chamber, said diaphragm forming one side of said chamber; a pilot valve for controlling the flow of control fluid under pressure to said chamber for effecting movement of said diaphragm in one direction toward a closed position of said valve member, said resilient valve member being operative to urge said diaphragm in another direction toward an open position of said valve member; a pressure sensitive actuating member for controlling movement of said pilot valve; a fluid flow regulator; a second venturi forming a portion of said fluid flow regulator and arranged in series with said first venturi, said actuating member being exposed on one side to throat fluid pressure of said first venturi and on the other side to a reference fluid pressure obtained upstream from said second venturi, whereby said pilot valve is moved to control fluid flow to said chamber in response to pressure changes in fluid flow from said source; and means for modifying said reference fluid pressure in accordance with changes in atmospheric pressure.

7. A fluid flow control system adapted for controlling flow of fluid under pressure from a source and delivery toward a point of use comprising: a flow limiting valve; a first venturi forming a portion of said valve; a helically shaped resilient valve member; a diaphragm operatively positioned for actuation of said valve member; a chamber, said diaphragm forming one side of said chamber; a first pilot valve for controlling the flow of control fluid under pressure to said chamber for effecting movement of said diaphragm in one direction toward a closed position of said valve member, said resilient valve member being operative to urge said diaphragm in another direction toward an open position of said valve member; a pressure sensitive actuating member for controlling movement of said first pilot valve; conduit means for conducting a portion of said fluid from said flow limiting valve to a first use space; branch conduit means for conducting another portion of said fluid to a second use space; a fluid flow regulator; a second venturi disposed in said branch conduit and forming a portion of said fluid flow regulator; a valve disposed in said branch conduit downstream from said second venturi; an actuator for controlling operation of said last mentioned valve; and a second pilot valve for controlling the flow of control fluid under pressure to said actuator in response to variations of the pressure differential across said second venturi, said actuating member being exposed on one side to throat fluid pressure of said first venturi and on the other side to a reference fluid pressure obtained upstream from said second venturi, whereby said first pilot valve is moved to control fluid flow to said chamber in response to pressure changes of fluid flow from said source.

8. A fluid flow control system adapted for controlling flow of fluid under pressure from a source and delivery toward a point of use comprising: a flow limiting valve; a first venturi forming a portion of said valve; a helically shaped resilient valve member; a diaphragm operatively positioned for actuation of said valve member; a chamber, said diaphragm forming one side of said chamber; a first pilot valve for controlling the flow of control fluid under pressure to said chamber for effecting movement of said diaphragm in one direction toward a closed position of said valve member, said resilient valve member being operative to urge said diaphragm in another direction toward an open position of said valve member; a pressure sensitive actuating member for controlling movement of said pilot valve; conduit means for conducting a portion of said fluid from said flow limiting valve to a first use space; branch conduit means for conducting another portion of said fluid to a second use space; a fluid flow regulator; a second venturi disposed in said branch conduit and forming a portion of said fluid flow regulator; a valve disposed in said branch conduit downstream from said second venturi; an actuator for controlling operation of said last mentioned valve; a second pilot valve for controlling the flow of control fluid under pressure to said actuator in response to variations of the pressure differential across said second venturi, said actuating member being exposed on one side to throat fluid pressure of said first venturi and on the other side to a reference fluid pressure obtained upstream from said second venturi, whereby said first pilot valve is moved to control fluid flow to said chamber in response to pressure changes in fluid flow from said source; and absolute pressure responsive means for modifying said reference fluid pressure in accordance with changes in atmospheric pressure.

9. A fluid flow control system adapted for controlling flow of fluid under pressure from a source and delivery toward a point of use comprising: a flow limiting valve; a first venturi forming a portion of said valve; a helically shaped resilient valve member; a diaphragm operatively positioned for actuation of said valve member; a chamber, said diaphragm forming one side of said chamber; a first pilot valve for controlling the flow of a control fluid under pressure to said chamber for effecting movement of said diaphragm in one direction toward a closed position of said valve member, said resilient valve member being operative to urge said diaphragm in another direction toward an open position of said valve member; a pressure sensitive actuating member for controlling movement of said pilot valve; conduit means for conducting a portion of said fluid from said flow limiting valve to a first use space; branch conduit means for conducting another portion of said fluid to a second use space; a fluid flow regulator; a second venturi disposed in said branch conduit and forming a portion of said fluid flow regulator; a valve disposed in said branch conduit downstream from said second venturi; an actuator for controlling operation of said last mentioned valve; a second pilot valve for controlling the flow of control fluid under pressure to said actuator in response to variations of the pressure differential across said second venturi, said actuating member being exposed on one side to throat fluid pressure of said first venturi and on the other side to a reference fluid pressure obtained upstream from said second venturi, whereby said first pilot valve is moved to control fluid flow to said chamber in response to pressure changes in fluid flow from said source; and pressure regulator means for said control fluid.

10. In a fluid flow limiting valve having a longitudinal axis: a venturi disposed axially in said valve; an annular chamber disposed radially outwardly from said venturi; a movable wall forming one side of said chamber; a resilient helically shaped valve member having one end operatively connected to said movable wall; a fixed support for the other end of said valve member; and pilot valve means responsive to a pressure differential across said venturi for controlling flow of a control fluid under pressure to said chamber to effect movement of said movable wall and the convolutions of said valve member toward a closed position, the resiliency of said valve member biasing said convolutions toward an open position.

11. A fluid flow limiting valve having a longitudinal axis and comprising: a venturi disposed axially within said valve; an annular chamber spaced radially outwardly from said venturi; a flexible diaphragm forming one side of said chamber; a resilient helically shaped valve member having one end operatively connected to said diaphragm; a fixed support for the other end of said valve member; and pilot valve means responsive to a pressure differential across said venturi for controlling flow of a control fluid under pressure to said chamber to effect movement of said diaphragm and of convolutions of said valve member toward a closed position, the resiliency of said valve member urging said convolutions toward an open position.

12. A fluid flow limiting valve having a longitudinal axis and comprising: a venturi disposed axially within said valve; an annular chamber spaced radially outwardly from said venturi; a flexible diaphragm forming one side of said chamber; a resilient helically shaped valve member having one end operatively connected to said diaphragm, convolutions of said valve member being hollow and oval in cross section; a fixed support for the other end of said valve member; and pilot valve means responsive to a pressure differential across said venturi for controlling flow of a control fluid under pressure to said chamber to effect movement of said diaphragm and of said convolutions of said valve member toward a closed position, the resiliency of said valve member biasing said convolutions toward an open position.

13. In a fluid flow limiting valve: an inlet and an outlet for said valve; a fluid flow passage through said valve and disposed between said inlet and said outlet; a venturi disposed in said passage, said venturi having an upstream portion spaced from said inlet, thereby to define a radially extending annular flow path outwardly from said passage; an annular chamber disposed radially outwardly from said venturi; a movable wall forming one side of said chamber; a resilient helically shaped valve member having one end operatively connected to said movable wall and extending in an axial direction across said annular flow path; a fixed support adjacent said inlet for the other end of said valve member; and pilot valve means for controlling flow of a control fluid under pressure to said chamber to effect movement of said movable wall and the convolutions of said valve member toward a closed position to occlude said annular flow path, the resiliency of said valve member biasing said convolutions towards an open position.

14. In a fluid flow limiting valve: an inlet and an outlet for said valve; a fluid flow passage through said valve and disposed between said inlet and said outlet; a venturi disposed in said passage, said venturi having an upstream portion spaced from said inlet to define a radially extending annular flow path outwardly from said passage; an annular chamber disposed radially outwardly from said venturi; a movable wall forming one side of said chamber; a resilient helically shaped valve member having one end operatively connected to said movable wall and extending in an axial direction across said annular flow path; a fixed support adjacent said inlet for the other end of said valve member; and pilot valve means operable in response to a pressure differential across said venturi for controlling flow of a control fluid under pressure to said chamber to effect movement of said movable wall and of convolutions of said valve member toward a closed position to occlude said annular flow path, the resiliency of said valve member biasing said convolutions toward an open position.

15. A fluid flow limiting valve comprising, in combination: an inlet and an outlet for said valve; a fluid flow passage through said valve and disposed between said inlet and said outlet; a venturi disposed in said passage, said venturi having an upstream portion spaced from said inlet to define a radially extending annular flow path outwardly from said passage; an annular chamber disposed radially outwardly from said venturi; a movable wall forming one side of said chamber; a resilient helically shaped valve member having convolutions that are oval in cross section and having one end operatively connected to said movable wall and extending in an axial direction across said annular flow path, said one end of said valve member overlying said upstream portion of said venturi; a fixed support adjacent said inlet for the other end of said valve member; and pilot valve means responsive to a pressure differential across said venturi for controlling flow of a control fluid under pressure to said chamber to effect movement of said movable wall and of said convolutions of said valve member toward a closed position to occlude said annular flow path, the resiliency of said valve member biasing said convolutions toward an open position.

References Cited in the file of this patent

UNITED STATES PATENTS

| | | |
|---|---|---|
| 125,937 | Cowles | Apr. 23, 1872 |
| 2,064,864 | Temple | Dec. 22, 1936 |
| 2,361,478 | Jennings | Oct. 31, 1944 |
| 2,379,008 | Klinker | June 26, 1945 |
| 2,419,707 | Cooper | Apr. 29, 1947 |
| 2,459,000 | Morris | Jan. 11, 1949 |
| 2,538,281 | Snyder | Jan. 16, 1951 |
| 2,556,829 | Teague | June 12, 1951 |
| 2,650,819 | Marlow | Sept. 1, 1953 |
| 2,665,624 | Arthur | Jan. 12, 1954 |

UNITED STATES PATENT OFFICE
CERTIFICATE OF CORRECTION

Patent No. 2,922,431                      January 26, 1960

Raymond W. Jensen

It is hereby certified that error appears in the printed specification of the above numbered patent requiring correction and that the said Letters Patent should read as corrected below.

Column 4, line 7, for "and to" read -- to and --; column 6, line 23, for "of", second occurrence, read -- to --.

Signed and sealed this 26th day of July 1960.

(SEAL)
Attest:

KARL H. AXLINE
Attesting Officer

ROBERT C. WATSON
Commissioner of Patents